United States Patent
Reis et al.

(10) Patent No.: US 8,910,277 B1
(45) Date of Patent: Dec. 9, 2014

(54) PROCESS-BASED DOMAIN ISOLATION

(75) Inventors: Charles Reis, Seattle, WA (US); Darin Fisher, San Carlos, CA (US); Adam Barth, Stanford, CA (US); Christian Lewis Evans, Mountain View, CA (US)

(73) Assignee: Google Inc., Mountain View, CA (US)

( * ) Notice: Subject to any disclaimer, the term of this patent is extended or adjusted under 35 U.S.C. 154(b) by 993 days.

(21) Appl. No.: 12/976,491

(22) Filed: Dec. 22, 2010

(51) Int. Cl.
*G06F 11/00* (2006.01)

(52) U.S. Cl.
USPC ............................................................ 726/22

(58) Field of Classification Search
None
See application file for complete search history.

(56) References Cited

U.S. PATENT DOCUMENTS

2010/0281537 A1* 11/2010 Wang et al. ..................... 726/22

* cited by examiner

*Primary Examiner* — Brandon Hoffman
(74) *Attorney, Agent, or Firm* — Sterne, Kessler, Goldstein & Fox P.L.L.C.

(57) ABSTRACT

Systems, methods and articles of manufacture for process-based domain isolation are discussed herein. A method embodiment includes determining domains associated with a plurality of content areas and rendering content areas associated with different domains into separate processes, wherein each domain from the one or more domains is associated with a separate process that communicates with its respective individual domain. The method further comprises identifying browsing instances including content areas that can script each other, identifying site instances including content areas sharing a common domain, and controlling communication between content areas across the identified site instances within each browsing instance.

16 Claims, 6 Drawing Sheets

PROCESS-BASED DOMAIN ISOLATION

BACKGROUND

1. Field

Embodiments generally relate to browsers, and particularly to web browser security.

2. Background Art

Multi-process web browsers can include a browser process and a plurality of renderer processes. Such web browsers may place privileged browser components, that are less likely to be exploited by malicious entities, in an unrestricted browser process. Less privileged components, that are more likely to be exploited by malicious entities, may be placed in 'sandboxed' or restricted renderer processes. In this approach, an attacker who gains control of (or exploits) a sandboxed renderer process, is limited by restrictions of the sandbox, making it difficult for the attacker to read or write files on a user's disk, etc. However, the attacker can still request content (e.g., HTML or XML documents) from web sites from within an exploited renderer process. This content can be requested with the user's session information (e.g., cookies) and credentials, so that it includes confidential user information. The attacker can then leak this confidential information to the attacker's own server by making additional network requests.

BRIEF SUMMARY

Embodiments relate to process-based domain isolation. A method embodiment includes determining domains associated with a plurality of content areas and rendering content areas associated with different domains into separate processes, where each domain from the one or more domains is associated with a separate process that communicates with its respective individual domain. The method further comprises identifying browsing instances including content areas that can script each other, identifying site instances including content areas sharing a common domain, and controlling communication between content areas across the identified site instances within each browsing instance.

In this way, for example, an unauthorized entity or attacker, who exploits a renderer process, will not be able to retrieve content (e.g., HTML or XML documents) from domains other than the specific domain associated with the exploited renderer process. This leads to a more secure browsing environment.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate to process-based domain isolation. A method embodiment includes determining domains associated with a plurality of content areas and rendering content areas associated with different domains into separate processes, where each domain from the one or more domains is associated with a separate process that communicates with its respective individual domain. In this way, for example, an unauthorized entity or attacker, who exploits a renderer process, will not be able to retrieve content (e.g., HTML or XML documents) from domains other than the specific domain associated with the renderer process. This leads to a more secure browsing environment.

While the following is discussed herein with reference to illustrative embodiments for particular applications, it should be understood that the embodiments are not limited thereto. Those skilled in the art with access to the teachings provided herein will recognize additional modifications and applications within the scope thereof and additional fields in which the embodiments would be of significant utility.

The term "content area" as used herein refers to an area of a user interface display that can display content addressed by an uniform resource locator (URL) or any other content addressing mechanism. As an illustrative example, content displayed in a content area may include, for example, a web page, application, document, video, multimedia content, future utilized content mechanism, or any combination thereof. These examples are illustrative and are not intended to limit the definition.

The term "browsing instance" as used herein refers to content areas that can communicate with each other via script code (or script each other using, for example, JavaScript).

The term "site instance(s)" as used herein refers to one or more instantiations of content from a single web site (i.e., domain) in a browsing instance. As a purely illustrative example, such instantiations of content from a web site may occur in distinct tabs of a browser or even distinct instantiations of the browser.

System

Figure 1A:
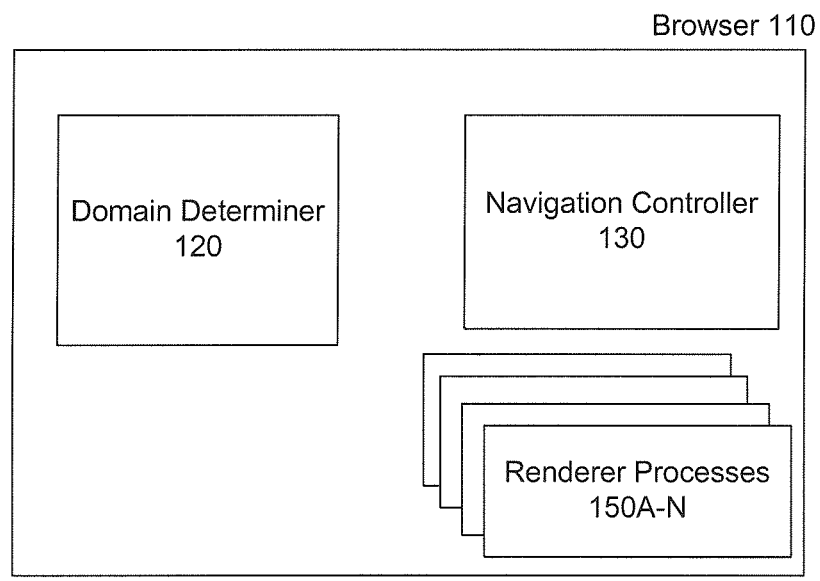
FIG. 1A illustrates a system for process-based domain isolation, according to an embodiment.

FIG. 1A is an architecture diagram of browser 110, according to an embodiment. In an embodiment, and as shown in FIG. 1A, browser 110 includes domain determiner 120 and navigation controller 130. In an embodiment, domain determiner 120 is configured to determine domains associated with a plurality of content areas addressed and retrieved by browser 110. Domains can include Internet or even local domains, including, but not limited to, web sites, web pages or any content areas that may share a common communication address. In an embodiment, navigation controller 130 is configured to assign content areas that are associated with different domains into separate renderer processes 150A-N, where each domain from the one or more domains is associated with a separate process that communicates with its respective individual domain. The operation of domain determiner 120 and navigation controller 130 is described further below.

Browser 110 may be implemented on any device that can support browsing. Such a device may include, but is not limited to, a device having a processor and memory for executing and storing instructions. Such a device may include software, firmware, and hardware. Software may include one or more applications and an operating system. Hardware can include, but is not limited to, a processor, memory and user interface display. Optional input devices, such as a mouse a touch sensitive screen, or any future developed interaction method may be used.

In an embodiment, browser 110 may be implemented as a multi-process browser. As an illustrative example, browser 110 can be the GOOGLE CHROME browser, provided by Google Inc. of Mountain View, Calif. A system for providing multi-process browser architecture may include at least one renderer process for each browsing instance that renders a content area and at least one browser process that communicates with one or more renderer processes. As shown in FIG. 1A, navigation controller 130 may instantiate a plurality of renderer processes 150A-N. A multi-process browser architecture is described in detail in U.S. patent application Ser. No. 12/464,594, entitled "Multi-Process Browser Architecture," which is incorporated by reference in its entirety.

In an embodiment, browser 110 may contact a remote server (not shown) and download data to display. In examples, the data may be represented as hypertext markup language (HTML), dynamic hypertext markup language (DHTML), extendable markup language (XML), image data, video or sound. In another example, browser 110 may download and execute scripts using XmlHttpRequests. XmlHttpRequests can asynchronously transmit and receive data from a server to update a content area without reloading the content area. It is to be appreciated that browser 110 can be configured to work with any version of mark-up languages known now (e.g., HTML5) or developed in the future.

As discussed above, a multi-process web browser architecture may use a sandboxed renderer process to isolate web sites and attackers from a user's locally stored resources. Thus, a user's locally stored resources may be protected from an attacker even if a sandboxed renderer process is compromised by, for example, an arbitrary code execution exploit. However, in some instances, web pages from different sites may share a single sandboxed renderer process. For this reason, a multi-process browser architecture may not be able to provide security for a user's web accounts if the renderer process is compromised by an attacker. Furthermore, unexpected interference may occur between web applications that share a single renderer process and a single thread of execution.

In contrast, embodiments render content areas associated with different domains into separate processes, where each domain from the one or more domains is associated with a separate process that communicates with its respective individual domain. In this way, for example, an unauthorized entity or attacker, who exploits a renderer process, will not be able to retrieve content (e.g., HTML or XML documents) from domains other than a specific domain associated with the renderer process.

Figure 2:
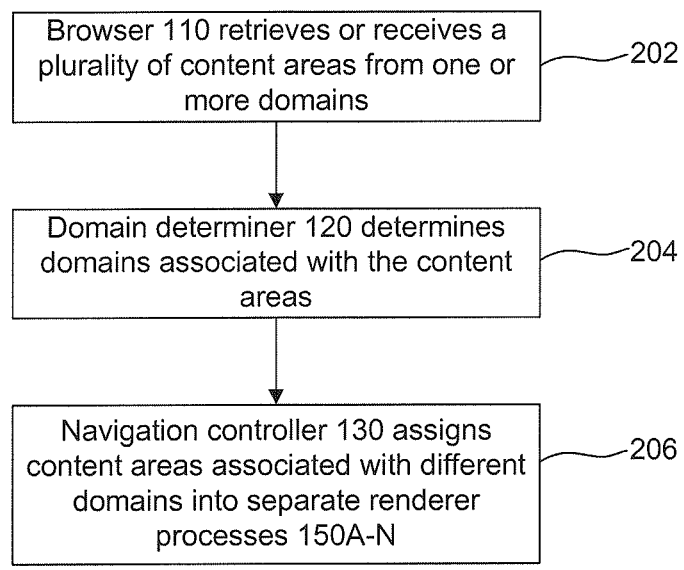
FIG. 2 is a flowchart illustrating an overall operation of the system, according to an embodiment.

FIG. 2 illustrates method 200 which is an exemplary overall operation of the system described in FIG. 1A.

In method 200, browser 110 retrieves a plurality of content areas from one or more domains (step 202). As an example, browser 110 can retrieve content area when a user provides a web address to browser 110 or when the user selects a hyperlink within a retrieved content area that causes the browser to navigate to another content area. In another example, browser 110 may automatically receive content from one or more content servers.

Domain determiner 120 determines the domains associated with the content areas retrieved in step 202 (step 204). As an example, domain determiner 120 can determine domains when browser 110 interacts with one or more content servers to retrieve content from the servers.

Navigation controller 130 assigns content associated with different domains to separate renderer processes, where each domain from the one or more domains is associated with a separate process that communicates with its respective individual domain (step 206).

Content Area Isolation

In an embodiment, navigation controller 130 places site instances from distinct web sites (or domains) in different processes, so that an exploited renderer process can only include potentially confidential information from a single site instance. Sites instances may include different instantiations of a web site occurring in distinct browser tabs or even occurring in distinct instantiations of the browser itself. In this way, by placing site instances from distinct web sites in different processes, content area isolation is achieved.

Frames allow display of more than one content area in the same browser window. For example, a web page can include multiple frames, where each frame displays content that can be distinct from other frames in the web page. In an embodiment, content within web page frames are placed by navigation controller 130 in separate renderer processes, so that a frame showing cross-site content (i.e., a document from a different web site) is rendered in a different process than its parent content. Such content area isolation achieves several benefits, including, but not limited to, document object model (DOM) isolation, elimination of cross-site interference and improved process management. DOM isolation is achieved by the embodiments because an exploited renderer process cannot directly access existing DOM trees of content from domains other than an specific domain associated with the renderer process. Cross-site interference is eliminated by the embodiments because a crash or slowdown in a site instance will not directly affect content areas or documents from other sites. In addition, because each domain is associated with a separate process that communicates with its respective individual domain, it is convenient to determine resources for which each renderer process is responsible. This improves task management for browser 110 and can make a task management interface of browser 110 more intelligible to users. Furthermore, features or parameters of browser 110 can be controlled separately for each renderer process. For example, browser 110 may be configured by a user to grant access to a web cam for a single web site that is placed by navigation controller 130 in a distinct renderer process 150A.

Figure 1B:
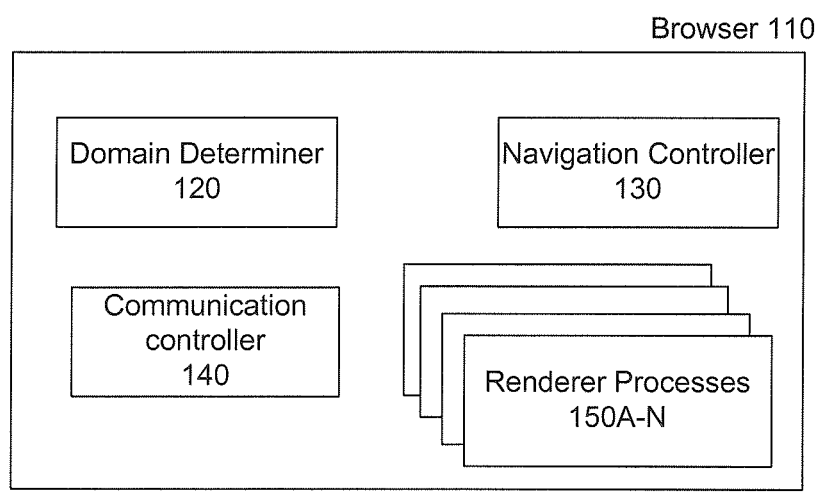
FIG. 1B illustrates a system for process-based domain isolation, according to another embodiment.

In order to support process-based domain isolation of documents in web browsers, embodiments support script calls (e.g., JavaScript calls) that can be made between content areas (e.g., web pages) from different domains. FIG. 1B illustrates a system for process-based domain isolation, according to another embodiment that includes communication controller 140. In an embodiment, and referring to FIG. 1B, if two content areas are from the same domain (or the same origin), communication controller 140 can allow the content areas to use JavaScript and the DOM (or any other script and object model) to access and modify each other's contents. If two content areas are from distinct domains, communication controller 140 may allow a small subset of function calls between the content areas.

Figure 1C:
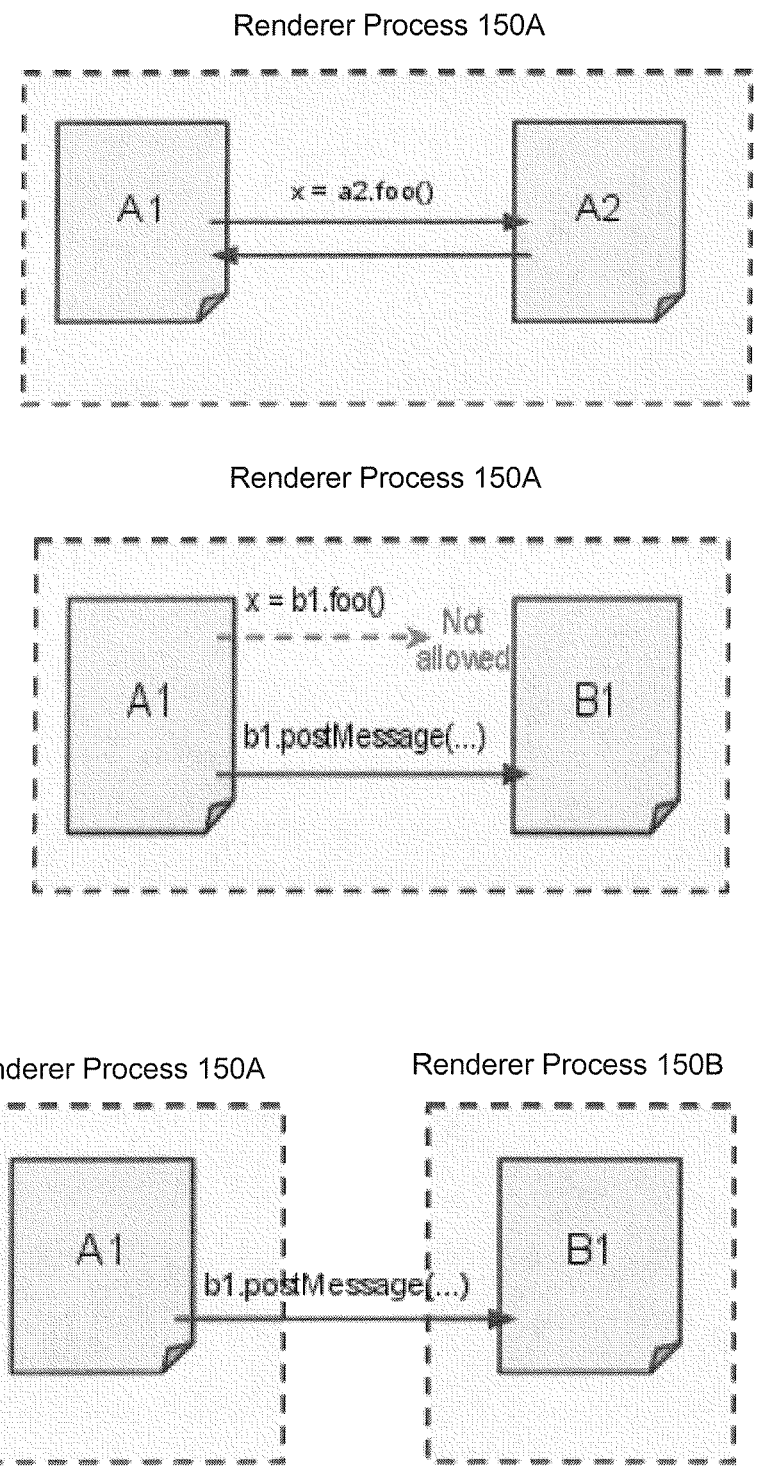
FIG. 1C illustrates function calls between exemplary content areas, according to an embodiment.

As an illustrative example, and referring to FIG. 1C, pages A1 and A2 (both from domain A) may call each other's JavaScript functions, or they may modify each other's content using DOM functions (e.g., appendChild, etc.). In an embodiment, if domain determiner 120 determines that two content areas from the same domain might communicate in this way, navigation controller 130 places the content areas in the same renderer process 150A.

If content areas are determined by domain determiner 120 to be from different domains and they are in the same renderer process, communication controller 140 may permit a subset of function calls between the content areas. For example, pages A1 and B1 (from different domains) are not permitted by communication controller 140 to call each other's JavaScript functions (e.g., x=b1.foo( )), but they may be permitted by communication controller 140 use a subset of DOM functions, such as 'postMessage'.

In an exemplary scenario, DOM functions that are permitted by communication controller 140, between content areas (e.g. web pages) from different domains, are effectively asynchronous. In other words, for example, a first content area can make a function call to a second content area (or read/write a value) without waiting for the second content area to do perform work or execute actions. Thus, navigation controller 130 can place cross-domain content areas that might communicate (e.g., a parent and a related child content area) in separate processes, keeping each renderer process dedicated to communicate with a single domain. For example, referring to FIG. 1C, navigation controller 130 places pages A1 and B1 (from different domains) in separate renderer processes 150A and 150B respectively.

Figure 3:
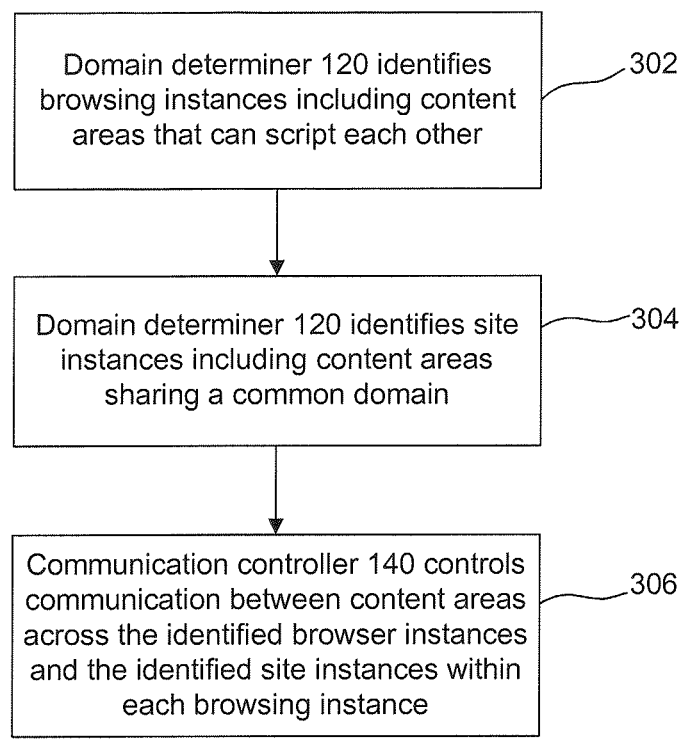
FIG. 3 is flowchart illustrating an operation of a domain determiner and a communication controller, according to an embodiment.

FIG. 3 illustrates method 300 which is an exemplary overall operation of the system described in FIG. 1B.

In method 300, domain determiner 120 identifies browsing instances that include content areas that can communicate with each other via script code (or script each other) (step 302).

Domain determiner 120 also identifies site instances that include content areas sharing a common domain within each browsing instance (step 304). As an example, domain determiner 120 identifies one or more instantiations of content originating from a single domain in a browsing instance. Such instantiations of content from a web site may occur, for example, in distinct tabs of a browser or even distinct instantiations of the browser.

Communication controller 140 controls communication between content areas across the identified site instances within each browsing instance (step 306). As an example, if two content areas are from the same domain (or the same origin), communication controller 140 can allow the content areas to use JavaScript and the DOM (or any other script and object model) to access and modify each other's contents. If two content areas are from distinct domains, communication controller 140 may allow a small subset of function calls between the content areas.

Top Level Document Isolation

One consideration with isolating all content areas from different domains is that such isolation may introduce an increase in computational overhead due to cross-site frames, with such cross-site frames requiring separate processes and more frequent inter-process communication calls. In a non-limiting embodiment, if navigation controller 130 determines that there are a number (e.g., any browser preset number) of to-be rendered content areas having cross-site frames, navigation controller 130 can perform 'top level' document isolation. In top level document isolation, for example, top-level (or root) documents from different sites are rendered in distinct processes. But rather than placing each cross-site frame in its own distinct process most cross-site frames are maintained by navigation controller 130 in a process of the cross-site frame's parent page. This can reduce memory and processing overhead that may be caused due to cross-site frames.

In a non-limiting example, embodiments can enable web site authors to opt-in to 'out-of-process' frames by specifying an attribute (e.g., 'sandbox' attribute) on specific frames. This approach would allow site authors to effectively isolate their page from any frames that they consider more disjoint or malicious. In an embodiment, browser 110 can be configured to detect such attributes so that such specified frames can be placed in separate processes. Similarly, for example, sites hosting sensitive resources could specify a Hyper Text Markup Language (HTTP) header (or any other identifier) to instruct browser 110 not to load their sensitive resources within a frame of another web site's page. This approach can address an exemplary scenario in which a malicious web site tries to load a sensitive resource in a (possibly hidden) frame and then exploits a renderer process to gain access to the frame's contents.

As an example, a malicious web site may load an unprotected page in a frame and then a sensitive page from the same origin server in a new tab of browser 110. The malicious web page could then exploit the unprotected page to reach into the sensitive page. To avoid such an attack, in an embodiment, a HTTP header (or any other identifier) can be applied to all web site resources by an server hosting the website, regardless of whether the resources are sensitive or confidential resources. In an embodiment, when such a header is identified by browser 110, a web site may be prevented from loading an unprotected page in a frame.

Credential Isolation

Certain cross-site requests that carry user credentials (e.g., cookies, HTTP authentication data, and any other user or session information) may leak information to attackers. If a compromised renderer process can request sub-resources (e.g., embedded images and script libraries) from sites with a user's credentials, it can access potentially confidential data or take damaging actions in the user's account. Users are normally protected against this threat because sub-resources are kept mostly opaque to web pages, i.e., embedded images and other objects cannot be sent back to a web page's own origin, and script libraries can be executed but not directly read.

In an embodiment, to prevent access to potentially confidential data and damaging actions in the user's account, communication controller 140 isolates a user's credentials between renderer processes 150A-N. This allows protection of web accounts from compromised or exploited renderer processes. To achieve this, and according to an embodiment, communication controller 140 does not include user credentials on cross-site sub-resource requests.

In this way, a compromised renderer process cannot be used to retrieve confidential information from the user's cross-site web accounts because any requests for cross-site sub-resources are fetched by browser 110 without the user's existing credentials. Furthermore, such credential isolation by communication controller 140 can also help protect users against web design flaws in which sub-resources are not truly opaque and inaccessible.

Opt-In Credential Isolation

In a non-limiting embodiment, instead of blocking credentials for all cross-site sub-resource requests, browser 110 can allow sites to opt-in to sub-resource credential isolation. In one approach for opt-in credential isolation, an origin server may include an HTTP header (or any other identifier) that prevents browser 110 from providing an object a sub-resource to a cross-site page, because the cross-site page may include sensitive information. In another approach for opt-in credential isolation, browser 110 may include an origin header on a request to a content server indicating that the request originated from a cross-site page. The content server could then return an empty or non-authenticated object instead of one containing sensitive or confidential information.

Session Cookie Isolation

A cookie is data that may be sent as a HTTP header by a web server to browser 110 and then sent back unchanged by browser 110 each time it accesses the same web server. Persistent cookies remain on a user's local storage until the user deletes them or they expire. The life of a persistent cookie is determined and preset by a web site which generated the persistent cookie. On the other hand, session cookies are cookies that do not expire, and those which are deleted by a browser at the end of a browsing session. A browsing session usually ends when an entire browser is exited. However, as browsers are increasingly becoming a platform for applications, it may become rare for many users to ever exit an instantiated browser.

In certain cases, session cookies, used by web sites, may cause user confusion between different "user visible sessions," such as, for example, looking at two different windows showing the same web merchant site, and having a purchase in one window affect the other window's shopping cart. More importantly, there can be security concerns like cross-site request forgery (CSRF) attacks, where an un-trusted page makes requests to a trusted site. These malicious requests may carry a user's session cookies, even if the user's "session" is in an unrelated window in the browser.

In an embodiment, browser 110 may maintain a separate set of session cookies for each browsing instance. This approach can defeat some CSRF attacks and eliminate some user confusion caused due to the different user visible sessions noted above. Furthermore, web sites may be configured to use 'HttpOnly' session cookies that cannot be accessed by exploited renderer processes that share the same browsing instance. In a non-limiting embodiment, browser 110 can be configured to work with web sites to use a combination of persistent and session cookies while requiring a new session cookie for sensitive or confidential resources.

Blocking Authenticated Sub-Resources

In an embodiment, and in an approach that may be used as an alternative to credential isolation, embodiments take benefit of the knowledge that most confidential information is found in HTML and XML content, and generally not in other sub-resources, such as JavaScript files. Accordingly, in an embodiment, browser 110 may prevent renderer processes 150A-N from receiving HTML/XML from different web sites (assuming that browser 110 strictly isolates content areas, including frames, based on their domain). As an illustrative example, a renderer process dedicated to site 'A' could request sub-resources from site 'B', but if browser 110 determines that the requested sub-resource has a content type of HTML (or XML), the content would not be delivered to renderer processes 150A-N for rendering. When operating with reference to a single domain, this determination of requested sub-resource type by browser 110 would not interfere with a web site because HTML is generally displayed in frames or fetched via same-site 'XmlHttpRequests'.

In this way, an exploited renderer process cannot receive sensitive or confidential HTML/XML files by claiming they are sub-resources (e.g., images, scripts etc.). Furthermore, this approach would also preserve browser 110's compatibility with existing web sites.

Example Computer Embodiment

Figure 4:
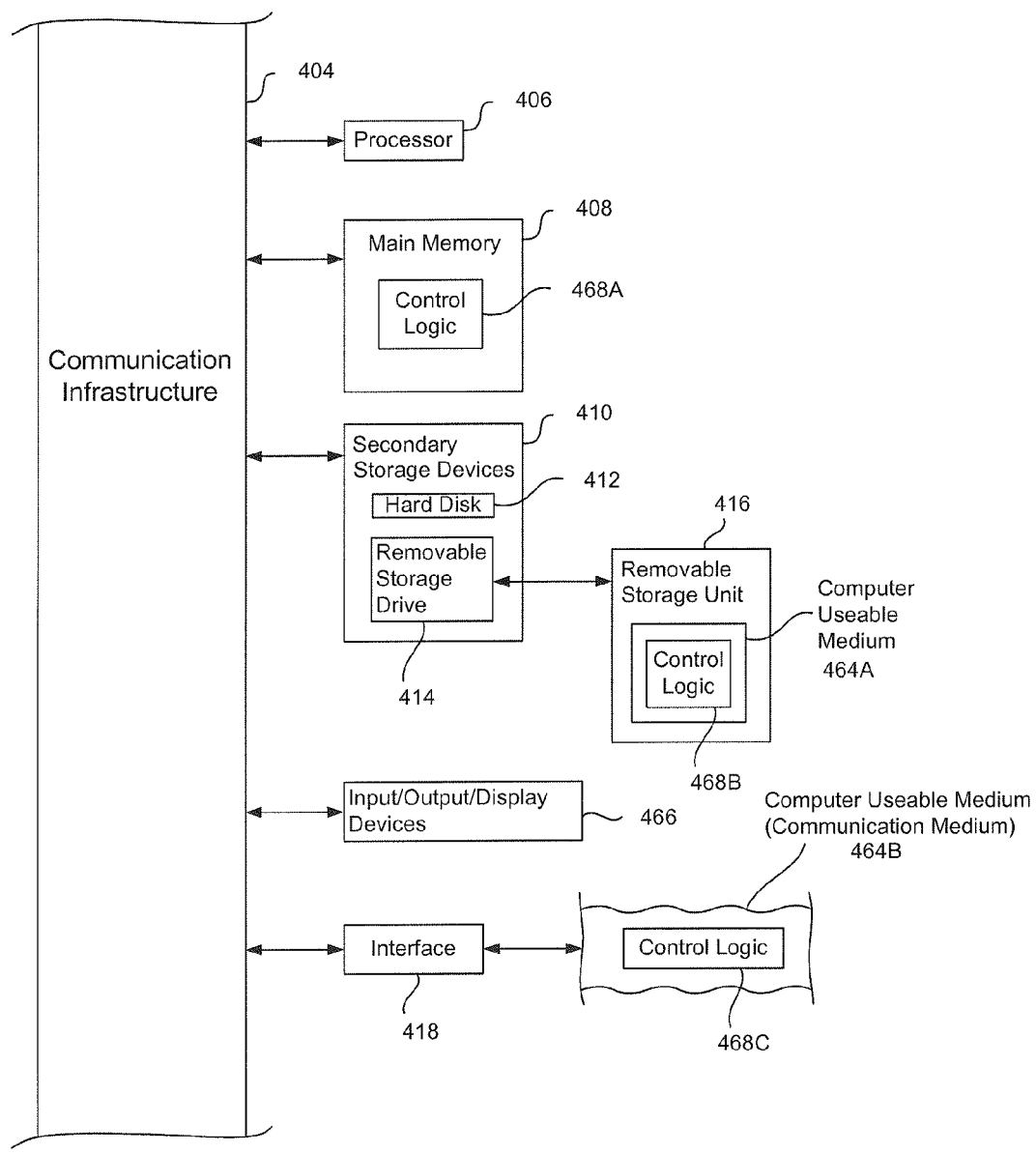
FIG. 4 illustrates an example computer useful for implementing components of the embodiments.

In an embodiment, the system and components of embodiments described herein are implemented using one or more computers, such as example computer 402 shown in FIG. 4. For example, browser 110, navigation controller 130 and domain determiner 120 can be implemented using computer(s) 402.

Computer 402 can be any commercially available and well known computer capable of performing the functions described herein, such as computers available from International Business Machines, Apple, Oracle, HP, Dell, Cray, etc.

Computer 402 includes one or more processors (also called central processing units, or CPUs), such as a processor 406. Processor 406 is connected to a communication infrastructure 404.

Computer 402 also includes a main or primary memory 408, such as random access memory (RAM). Primary memory 408 has stored therein control logic 468A (computer software), and data.

Computer 402 also includes one or more secondary storage devices 410. Secondary storage devices 410 include, for example, a hard disk drive 412 and/or a removable storage device or drive 414, as well as other types of storage devices, such as memory cards and memory sticks. Removable storage drive 414 represents a floppy disk drive, a magnetic tape drive, a compact disk drive, an optical storage device, tape backup, etc.

Removable storage drive 414 interacts with a removable storage unit 416. Removable storage unit 416 includes a computer useable or readable storage medium 464A having stored therein computer software 468B (control logic) and/or data. Removable storage unit 416 represents a floppy disk, magnetic tape, compact disk, DVD, optical storage disk, or any other computer data storage device. Removable storage drive 414 reads from and/or writes to removable storage unit 416 in a well known manner.

Computer 402 also includes input/output/display devices 466, such as monitors, keyboards, pointing devices, Bluetooth devices, etc.

Computer 402 further includes a communication or network interface 418. Network interface 418 enables computer 402 to communicate with remote devices. For example, network interface 418 allows computer 402 to communicate over communication networks or mediums 464B (representing a form of a computer useable or readable medium), such as LANs, WANs, the Internet, etc. Network interface 418 may interface with remote sites or networks via wired or wireless connections.

Control logic 468C may be transmitted to and from computer 402 via communication medium 464B.

Any tangible apparatus or article of manufacture comprising a computer useable or readable medium having control logic (software) stored therein is referred to herein as a computer program product or program storage device. This includes, but is not limited to, computer 402, main memory 408, secondary storage devices 410 and removable storage unit 416. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments as contemplated by the inventor(s), and thus, are not intended to limit the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A computer implemented method for process-based domain isolation in a browser, comprising:
   determining, using one or more processors, different domains associated with a plurality of content areas; and
   rendering, using the one or more processors, content areas associated with the different domains in separate processes, wherein each one of the separate processes is dedicated to direct communication with its respective associated domain; and
   selectively permitting, using the one or more processors, asynchronous communications between the content areas associated with the different domains.

2. The method of claim 1, further comprising:
   controlling communication between separate processes, wherein the separate processes are associated with their respective individual domains.

3. The method of claim 1, further comprising:
   identifying browsing instances including content areas that can script each other;
   identifying site instances including content areas sharing a common domain; and
   controlling communication between content areas across the identified site instances within each browsing instance.

4. The method of claim 1, further comprising:
   enabling a first content area to access and modify a second content area, when the first content area and the second content area share the common domain.

5. The method of claim 4, further comprising:
   executing a script in the second content area from the first content area, when the first content area and the second content area share a common domain; and
   preventing execution of a script in the second content area from the first content area, when the first content area and the second content area do not share a common domain.

6. The method of claim 4, further comprising:
   selectively permitting one or more asynchronous document object model (DOM) function calls between the second content area and the first content area, when the first content area and the second content area do not share a common domain.

7. A computer-based system for process-based domain isolation in a browser, comprising:
   one or more processors;
   a domain determiner configured to determine different domains associated with a plurality of content areas;
   a navigation controller configured to assign content areas that are associated with the different domains in separate processes, wherein each one of the separate processes is dedicated to direct communication with its respective associated domain; and
   a communication controller configured to selectively permit asynchronous communications between the content areas associated with the different domains,
   wherein the domain determiner, the navigation controller, and the communication controller are implemented on the one or more processors.

8. The system of claim 7, wherein the communication controller is configured to control communication between separate processes, wherein the separate processes are associated with their respective individual domains.

9. The system of claim 8, wherein the communication controller is configured to control communication between content areas across browsing instances and site instances.

10. The system of claim 7, wherein the content areas are web-pages.

11. An article of manufacture including a computer-readable device having instructions stored thereon that, when executed by a computing device, cause said computing device to perform operations comprising:
    determining different domains associated with a plurality of content areas; and
    rendering content areas associated with the different domains in separate processes, wherein each one of the separate processes is dedicated to direct communication with its respective associated domain; and
    selectively permitting asynchronous communications between the content areas associated with the different domains.

12. The article of manufacture of claim 11, the operations further comprising:
    controlling communication between separate processes, wherein the separate processes are associated with their respective individual domains.

13. The article of manufacture of claim 11, the operations further comprising:
    identifying browsing instances including content areas that can script each other;
    identifying site instances including content areas sharing a common domain; and
    controlling communication between content areas across the identified site instances within each browsing instance.

14. The article of manufacture of claim 11, the operations further comprising:
    enabling a first content area to access and modify a second content area, when the first content area and the second content area share a common domain.

15. The article of manufacture of claim 14, the operations further comprising:
    executing a script in the second content area from the first content area, when the first content area and the second content area share a common domain; and preventing execution of a script in the second content area from the first content area, when the first content area and the second content area do not share a common domain.

16. The article of manufacture of claim 14, the operations further comprising:

selectively permitting one or more asynchronous document object model (DOM) function calls between the second content area and the first content area, when the first content area and the second content area do not share a common domain.

\* \* \* \* \*